United States Patent
Lee et al.

(10) Patent No.: US 9,160,436 B1
(45) Date of Patent: Oct. 13, 2015

(54) OPTIMAL DECODING OF TRANSMIT DIVERSITY CODE WITH VARYING CHANNEL CHARACTERISTICS

(71) Applicant: Marvell International Ltd., Hamilton (BM)

(72) Inventors: Jungwon Lee, San Diego, CA (US); Rohit U. Nabar, Sunnyvale, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/107,183

(22) Filed: Dec. 16, 2013

Related U.S. Application Data

(63) Continuation of application No. 12/055,256, filed on Mar. 25, 2008, now Pat. No. 8,611,480.

(60) Provisional application No. 60/908,021, filed on Mar. 26, 2007.

(51) Int. Cl.
*H03D 1/00* (2006.01)
*H04L 27/06* (2006.01)
*H04B 7/08* (2006.01)
*H04B 1/10* (2006.01)

(52) U.S. Cl.
CPC ... *H04B 7/08* (2013.01); *H04B 1/10* (2013.01)

(58) Field of Classification Search
CPC ............... H04B 7/0417; H04B 7/0413; H04L 25/0204; H04L 5/0023
USPC .......................................................... 375/343
See application file for complete search history.

(56) References Cited

U.S. PATENT DOCUMENTS

| | | | |
|---|---|---|---|
| 6,185,258 B1 * | 2/2001 | Alamouti et al. ............. | 375/260 |
| 6,937,644 B2 | 8/2005 | Pan et al. | |
| 7,483,364 B2 * | 1/2009 | Jeon et al. .................... | 370/203 |
| 7,646,833 B1 | 1/2010 | He et al. | |
| 2003/0147343 A1 * | 8/2003 | Onggosanusi et al. ....... | 370/209 |
| 2005/0195733 A1 | 9/2005 | Walton et al. | |
| 2005/0249159 A1 | 11/2005 | Abraham et al. | |
| 2006/0078066 A1 | 4/2006 | Yun et al. | |
| 2006/0215773 A1 | 9/2006 | Jeon et al. | |
| 2008/0095039 A1 | 4/2008 | Joo et al. | |
| 2010/0002570 A9 | 1/2010 | Walton et al. | |
| 2014/0232575 A1 * | 8/2014 | Le Dortz et al. ............. | 341/118 |

* cited by examiner

*Primary Examiner* — Shuwang Liu
*Assistant Examiner* — Gina McKie

(57) ABSTRACT

Systems and methods are provided for decoding a signal vector in a transmit diversity scheme for varying channels. Information obtained in more than one symbol period are treated as a single received vector, and each of the received signal vectors may be processed to reduce the effects of varying channel characteristics. The received signal vectors may be combined by addition and decoded using a maximum-likelihood decoder. In some embodiments, the received signal vectors are processed separately and then combined. In other embodiments, the received signal vectors are combined and then processed. In some embodiments, zero-forced linear equalization techniques are used to processed the received signals. In some embodiments the signal vectors and varying channel response matrices are broken down to equivalent forms in order to simplify the processing.

19 Claims, 16 Drawing Sheets

$$\begin{bmatrix} y_1^{(1)} \\ \vdots \\ y_{N_r}^{(1)} \end{bmatrix} = \begin{bmatrix} h_{1,1}^{(1)} & h_{1,2}^{(1)} \\ \vdots & \vdots \\ h_{N_r,1}^{(1)} & h_{N_r,2}^{(1)} \end{bmatrix} \begin{bmatrix} x_1 \\ x_2 \end{bmatrix} + \begin{bmatrix} n_1^{(1)} \\ \vdots \\ n_{N_r}^{(1)} \end{bmatrix}$$

$$\begin{bmatrix} y_1^{(2)} \\ \vdots \\ y_{N_r}^{(2)} \end{bmatrix} = \begin{bmatrix} h_{1,1}^{(2)} & h_{1,2}^{(2)} \\ \vdots & \vdots \\ h_{N_r,1}^{(2)} & h_{N_r,2}^{(2)} \end{bmatrix} \begin{bmatrix} -x_2^* \\ x_1^* \end{bmatrix} + \begin{bmatrix} n_1^{(2)} \\ \vdots \\ n_{N_r}^{(2)} \end{bmatrix}$$

FIG. 4

$$\begin{bmatrix} y_1^{(1)} & \cdots & y_{N_r}^{(1)} \end{bmatrix} = \begin{bmatrix} h_{1,1}^{(1)} & \cdots & h_{N_r,1}^{(1)} \\ h_{1,2}^{(1)} & \cdots & h_{N_r,2}^{(1)} \end{bmatrix} \begin{bmatrix} x_1 \\ x_2 \end{bmatrix} + \begin{bmatrix} n_1^{(1)} & \cdots & n_{N_r}^{(1)} \end{bmatrix}$$

$$\begin{bmatrix} y_1^{(2)*} & \cdots & y_{N_r}^{(2)*} \end{bmatrix} = \begin{bmatrix} h_{1,2}^{(2)*} & \cdots & h_{N_r,1}^{(2)*} \\ -h_{1,1}^{(2)*} & \cdots & -h_{N_r,1}^{(2)*} \end{bmatrix} \begin{bmatrix} x_1 \\ x_2 \end{bmatrix} + \begin{bmatrix} n_1^{(2)*} & \cdots & n_{N_r}^{(2)*} \end{bmatrix}$$

FIG. 5

OPTIMAL DECODING OF TRANSMIT DIVERSITY CODE WITH VARYING CHANNEL CHARACTERISTICS

CROSS-REFERENCE TO RELATED APPLICATIONS

This application is a continuation of U.S. patent application Ser. No. 12/055,256, filed Mar. 25, 2008, which claims the benefit under 35 U.S.C. §119(e) of U.S. Provisional Application No. 60/908,021, filed Mar. 26, 2007, each of which is hereby incorporated by reference herein in its entirety.

This application is related to U.S. patent application Ser. No. 11/854,219, filed Sep. 12, 2007. The disclosures of these applications are all hereby incorporated by reference in their entirety.

BACKGROUND OF THE INVENTION

This invention relates to decoding techniques in which multiple instances of the same signal are transmitted over media having varying channel characteristics.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium (e.g., a channel), or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One transmission technique to increase reliability when the transmitter does not have information about the channel is to increase the number of outputs (e.g., antennas) that the same information is transmitted. Thus, the same information may travel through multiple paths, allowing the receiver to more reliably estimate the transmitted information. This transmission technique is referred to as transmit or space diversity.

Even using transmit diversity, the receiver may still interpret the information incorrectly because of excessive channel effects and any additive noise that is independent of the channel. These errors may be corrected using an error correction scheme. To correct errors that may occur, redundancy is often added to a data stream. Therefore, when a reasonably small number of errors occur, there is still enough information to make an accurate determination of the transmitted sequence. The redundancy added to the data stream is determined based on an error correction code, such as a Reed-Solomon or Golay code.

Alamouti coding is one particular transmit diversity scheme that is used for wireless communications. In an Alamouti coding scheme at least two transmission antennas are used to transmit signal packets to one or more receiver antennas. The two antennas transmit a set of signal vectors during a first signal period and re-transmit the same (or equivalent) signal vectors during a succeeding signal period. At the receiver, an Alamouti decoder receives the two transmissions and combines them to recover the transmitted signal vectors. The Alamouti decoder recovers the signal vectors by reducing the effects of the transmission channel on the received signal. Typical Alamouti decoders assume that the characteristics of the transmission channel do not vary over time and, therefore, use the same channel estimates for processing the two successive transmissions. Typical Alamouti coding schemes therefore do not perform well when transmitted signals are coded over time and when the transmission channel (or characteristics of the transmission channel) varies over time.

SUMMARY OF THE INVENTION

Systems and methods for reliable transmission and reception are disclosed, where varying channel characteristics are used to process received signals in a transmit diversity scheme such as an Alamouti coding scheme.

A transmitter may send two symbols $x_1$ and $x_2$, or $x^{(1)}$ in vector form, from each of its two outputs to the receiver. In the next time interval (or "symbol period"), the transmitter may send $-x^*_2$ and $x^*_1$, or $x^{(2)}$, from the outputs, thereby transmitting information about both $x_1$ and $x_2$ again. Using this scheme, information about each symbol is transmitted from both antennas. Thus, this technique utilizes transmit diversity. The receiver, which has $N_r \geq 1$ inputs, may receive two $N_r$-dimensional signal vectors corresponding to the two separate transmissions.

After receiving both $x^{(1)}$ and $x^{(2)}$ as $y^{(1)}$ and $Y^{(2)}$, respectively, the receiver may combine the two vectors into a $2N_r$-dimensional vector, given by, $$y = Hx + n,$$

where y is the received signal vector, x is the transmitted signal vector, H is a channel response matrix, and n is noise.

In some embodiments, received signals $y^{(1)}$ and $y^{(2)}$ are processed separately using their associated channel response matrices $H^{(1)}$ and $H^{(2)}$, where $H^{(1)}$ represents the effects of the transmission channel associated with $y^{(1)}$ and $H^{(2)}$ represents the effects of the transmission channel associated with $y^{(2)}$. Then the processed signals can be combined into a combined processed signal from with the transmitted signals can be decoded using any suitable hard or soft decoding technique.

In other embodiments, received signals $y^{(1)}$ and $y^{(2)}$ are combined into a received signal vector y which can be processed using channel response matrix H. The processed signal vector can be decoded using any suitable hard or soft decoding technique. In some embodiments, processing signal vector y with channel response matrix H may include zero-forced linear equalization and breaking down the signal vectors and channel response matrices into equivalent forms to simplify the processing.

In yet other embodiments, an apparatus for decoding a signal vector in a transmit diversity scheme may be provided. The apparatus includes means for receiving a first signal vector and a second signal vector within different symbol periods, means for processing the first signal vector based on a first varying channel response matrix, means for processing the second signal vector based on a second varying channel response matrix means for combining the processed first signal vector and the processed second signal vector to form a combined signal vector, and means for decoding the combined signal vector. Both the first signal vector and the second signal vector may correspond to a first set of transmitted symbols. Another apparatus for decoding a signal vector in a transmit diversity scheme may be provided that includes means for receiving a first signal vector within a first signal period and a second signal vector within a second signal period, means for receiving a varying channel response matrix made up of plurality of channel response components, means for combining the first and second signal vectors to form a combined signal vector, means for processing the combined signal vector based on the channel response matrix, and means for decoding the processed signal vector. A first portion of the channel response components correspond to the first symbol period and a second portion of the channel response components correspond to the second symbol period.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 4 is a vector model of the system in FIG. 1;

FIG. 5 is another vector model of the system in FIG. 1;

DETAILED DESCRIPTION OF THE INVENTION

The disclosed invention provides a technique for decoding received symbols, where multiple copies of the same transmitted symbols are received over channels with varying characteristics.

Figure 1:
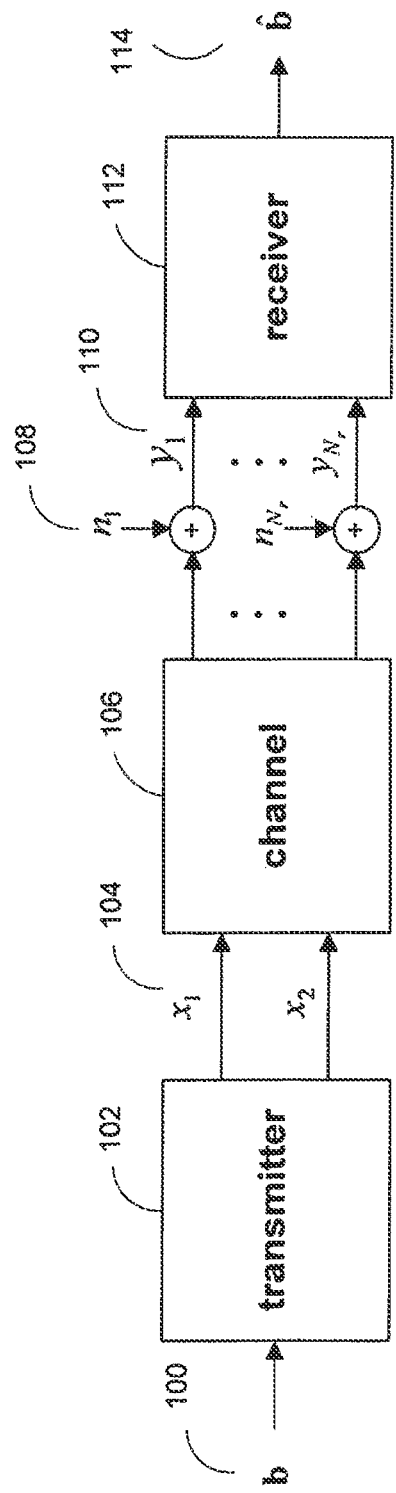
FIG. 1 is a high level block diagram of a multiple-input multiple-output data transmission or storage system.

FIG. 1 shows an illustration of a basic data transmission or storage system in accordance with one embodiment of the present invention. Data is sent from transmitter 102 to receiver 112. During transmission, the signals may be altered by a transmission medium, represented by channel 106, and additive noise sources 108. Transmitter 102 may have two outputs 104 and receiver 112 may have $N_r$ inputs 110. In one embodiment, channel 106 is modeled as a multiple-input multiple-output (MIMO) system with two inputs and $N_r$ outputs. The two inputs and $N_r$ outputs are typically implemented spatially to create a system with transmit diversity. While this system is illustrated with two inputs and $N_r$ outputs, any other suitable number of inputs and outputs can also be used.

Figure 2:
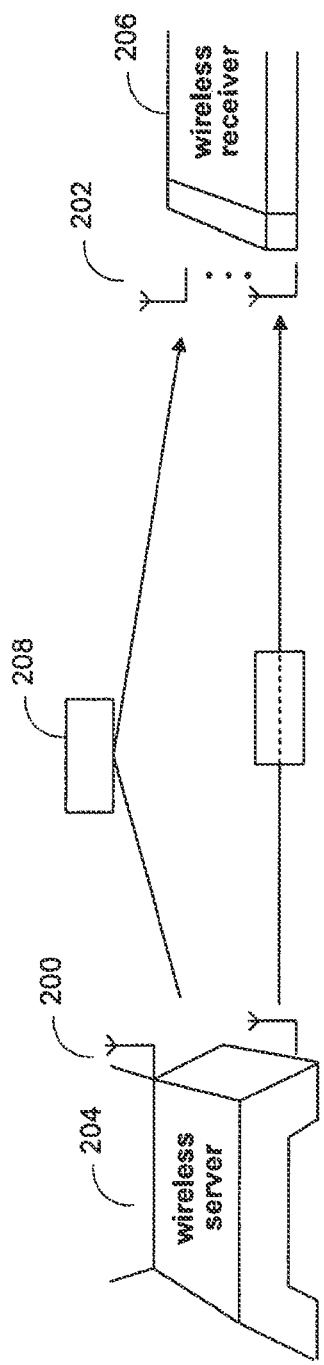
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204 (e.g., a commercial gateway modem or other device) and receiver 112 is a wireless receiver 206 (e.g., a commercial wireless computer adapter or other device). Channel 106 is space 208 between wireless server 204 and wireless receiver 206, which obstructs and attenuates the signal due to at least time-varying or frequency-varying multipath fades and shadowing effects. Typically, wireless communication systems use multiple transmitting antennas 200 and receiving antennas 202 to implement a MIMO system.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of a message. Thus, bit sequence 100 may have originated from a binary data source, from the output of a source encoder (not pictured), or from any other suitable source that outputs a bit sequence.

Figure 3:
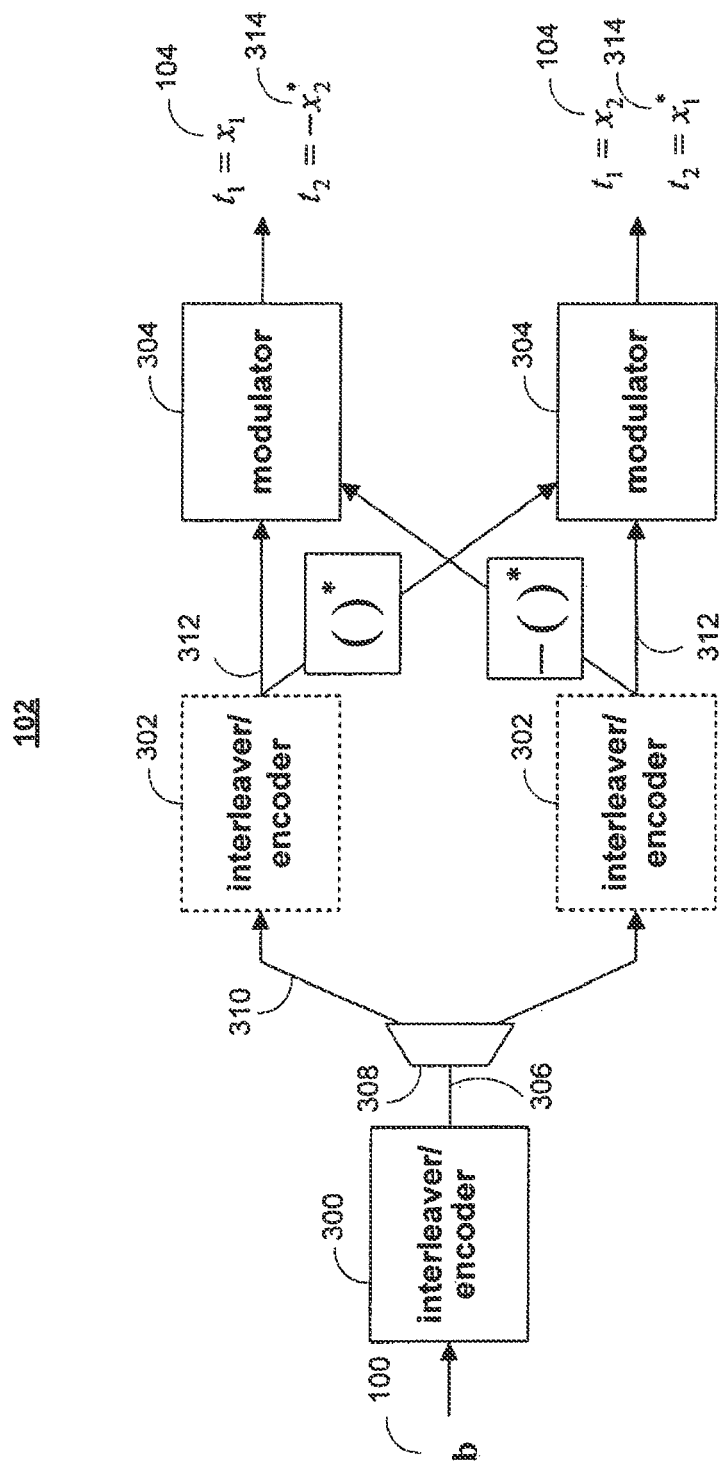
FIG. 3 is a block diagram of a transmitter.

One simplified embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300 for interleaving and/or encoding bit sequence 100. If interleaver/encoder 300 encodes bit sequence 100, the encoding may be based on any suitable error correcting or error detecting code (e.g., CRC code, convolutional code, Turbo code, LDPC code, RS code, and so on). Also, by interleaving bit sequence 100, each bit in bit sequence 100 may be assumed to be independent of all other bits in bit sequence 100. Bit sequence 306 at the output of interleaver/encoder 300 may be demultiplexed by demultiplexor 308 across two paths 310. Each demultiplexed output 310 may or may not go through another interleaver and/or encoding block 302, yielding bit sequences 312. Finally, bit sequences 312 are modulated with modulators 304, which group bit sequences 312 into m-bit symbols, and transmit each symbol as a signal.

During a first time interval corresponding to a transmission of one symbol at each modulator output, the transmitter may transmit symbols $x_1$ and $x_2$ 104. A time interval corresponding to a transmission of one symbol from a given output is referred to as a symbol period. In the next symbol period, rather than transmitting the next two m-bit symbols in bit sequence 312, the transmitter may send information about $x_2$ from the first output, and may send information about $x_1$ from the second output. In particular, the transmitter may send and $-x^*_2$ and $x^*_1$ 314 at the first and second outputs, respectively, where $-x^*_2$ is the negative of the complex conjugate of $x_2$ and $x^*_1$ is the complex conjugate of $x_1$. During the second symbol period, (in one embodiment) $-x^*_2$ and $x^*_1$ are sent instead of $x_2$ and $x_1$ to prevent the transmissions from the first and second symbol periods from interfering with each other. Therefore, using this transmission scheme, all of the information in bit sequence 100 is transmitted from both outputs of the transmitter. This transmit diversity transmission scheme is hereinafter referred to as the Alamouti scheme.

Modulators 304 group the incoming bits of sequences 312 into symbols $x_1$ and $x_2$. The symbols may then be mapped and converted to signals according to a signal constellation set and carrier signal. In one embodiment, modulator 304 uses quadrature amplitude modulation (QAM). Each symbol is mapped to a signal point in the QAM signal constellation set, where the signal points are differentiated from one another by phase and/or magnitude.

FIG. 4 shows an illustrative vector model of the system in FIG. 1. In this illustrative system two symbols $x_1$ and $x_2$ are transmitted from two transmitter outputs during two successive symbol periods and are received by $N_r$ receiver inputs. Received signals $y_r^{(i)}$ represent the signals received by input r of receiver 112 (FIG. 1) at time i. Channel 106 can be modeled as a series of channel response components $h_{r,t}^{(i)}$ which represent the effect of channel 106 on the signal received by input r of receiver 112 which was transmitted by output t of transmitter 102 at time i. Finally, additive noise sources 108 can be modeled as noise components $n_r^{(i)}$ which represent the additive noise received at input r of receiver 112 at time i. This vector model can be written in concise form as, $$y^{(1)} = H^{(1)}x + n^{(1)} \quad (1)$$

$$y^{(2)} = H^{(2)}\tilde{x} + n^{(2)}, \quad (2)$$

where $y^{(1)}$ and $y^{(2)}$ represent the signals received from the transmission of symbol x over two successive symbol periods.

Conventional Alamouti transmission schemes assume that the channel response characteristics do not change in two successive symbol periods and, therefore, use the same channel response matrix H for both $y^{(1)}$ and $y^{(2)}$. However, in accordance with the present invention, it is assumed that the channel matrix H may be different for each symbol period. Differences may arise because each transmission of x occurs at a different time, on a different frequency channel, or through a different medium.

Noise sources 108 may be modeled as additive white Gaussian noise (AWGN) sources. In this case, noise sources 108 are independent and identically distributed (i.i.d). That is, the noise that affects any of the $N_r$ components in any $n^{(i)}$ does not affect the noise for any other component in $n^{(i)}$. Also, all of the noise sources have the same probabilistic characteristics. Furthermore, each component of $n^{(i)}$ has zero mean and is random in terms of both magnitude and phase, where the magnitude and the phase are also independent. This type of noise source is called an i.i.d. zero mean circularly symmetric complex Gaussian (ZMCSCG) noise source.

FIG. 5 shows illustrative vector model that is equivalent to the vector model shown in FIG. 4. In FIG. 5, instead of using the complex conjugate and the negative complex conjugate of symbols $x_1$ and $x_2$ for the second symbol period, mathematically equivalent operations are taken with received signal $y^{(2)}$, channel matrix $H^{(2)}$, and noise components $n^{(2)}$. While mathematically equivalent to the vector model in FIG. 4, the vector model in FIG. 5 may be can be written in concise form as, $$y^{(1)} = H^{(1)}x + n^{(1)} \quad (3)$$

$$\tilde{y}^{(2)} = \tilde{H}^{(2)}x + \tilde{n}^{(2)} \quad (4)$$

Equations (3) and (4) can be combined into a single equation, given by, $$\begin{bmatrix} y^{(1)} \\ \tilde{y}^{(2)} \end{bmatrix} = \begin{bmatrix} H^{(1)} \\ \tilde{H}^{(2)} \end{bmatrix} x + \begin{bmatrix} n^{(1)} \\ \tilde{n}^{(2)} \end{bmatrix} \quad (5)$$

Equation (5) can be further simplified to, $$y = Hx + n \quad (6)$$

In a conventional Alamouti transmission scheme, time variation of the channel response matrix is ignored. An approximation of the transmitted information z, can be obtained from, $$z = H^* y, \quad (7)$$

where H* is the conjugate transpose of a static channel response matrix. Symbols $x_1$ and $x_2$ are then estimated from signal z as if there were no interference. While transmission systems based on this conventional Alamouti scheme are often able to determine transmitted information using a static estimate of channel response matrix H, the performance of these systems degrades for varying channels.

One improvement to the conventional Alamouti transmission scheme attempts to calculate an average channel response matrix $H_{avg}$ over two successive symbol periods, given by, $$H_{avg} = \frac{H^{(1)} + H^{(2)}}{2}, \quad (8)$$

where channel response matrix $H^{(1)}$ is calculated for a first symbol period and channel response matrix $H^{(2)}$ is calculated for a second symbol period. $H_{avg}$ can be used to calculate z from y, by $$z = H^*_{avg} \tilde{H}^*_{avg} y, \quad (9)$$

where $\tilde{H}^*_{avg}$ is computed in the same manner as $\tilde{H}^{(2)}$ shown in FIG. 5. While signal z, calculated using $H_{avg}$, may represent an improvement over the conventional Alamouti transmission scheme, the signal z still does not properly reflect the effects of the varying channel on the transmitted signal.

Figure 6:
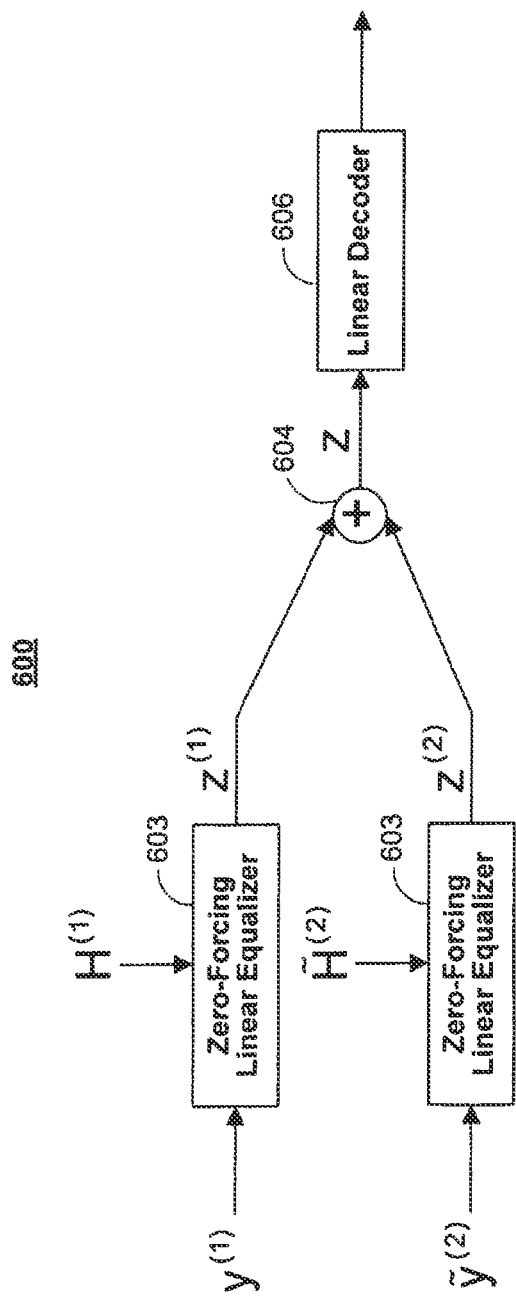
FIGS. 6 and 7 are block diagrams of receivers for processing and combining received signal vectors using channel response matrices.

FIG. 6 shows an illustrative and simplified block diagram of receiver 600 for decoding received symbols using a varying channel response matrix, in accordance with one embodiment of the present invention. Receiver 600 includes zero-forcing linear equalizers (ZF-LE) 603, adder 604, and linear decoder 606. Each of the received signals $y^{(1)}$ and $\tilde{y}^{(2)}$ are processed separately using ZF-LEs 603 which use varying channel response matrices $H^{(1)}$ and $\tilde{H}^{(2)}$ to preferably cancel or greatly reduce the effects of the varying channel. The operation of an ideal ZF-LE 603 can be written as, $$z^{(1)} = (H^{(1)*}H^{(1)})^{-1}H^{(1)*}y^{(1)} \quad (10)$$

$$z^{(2)} = (\tilde{H}^{(2)*}\tilde{H}^{(2)})^{-1}\tilde{H}^{(2)*}\tilde{y}^{(2)} \quad (11)$$

Equalized signals $z^{(1)}$ and $z^{(2)}$ can then be combined by adder 604. Separately processing signals $y^{(1)}$ and $\tilde{y}^{(2)}$ and then combining equalized signals $z^{(1)}$ and $z^{(2)}$ provides the benefits of a transmit diversity transmission scheme without requiring an Alamouti processor to combine signals $y^{(1)}$ and $\tilde{y}^{(2)}$ as they are received.

Adder 604 preferably uses a combining technique that maximizes signal-to-noise ratio (SNR) in order to provide single output signal from the two successive equalized signals $z^{(1)}$ and $z^{(2)}$. A combining scheme that maximizes this metric will hereinafter be referred to as a maximal-ratio combining (MRC) scheme. In particular, by weighting each signal vector by the inverse of its effective channel matrix, adder 604 produces a combined signal vector having maximal SNR.

Generally, MRC is only one form of combining that may be implemented by receiver 600. In other embodiments, receiver 600 may implement other symbol-level combining schemes such as concatenated-assisted symbol-level combining (CASLC). CASLC schemes, their features, and various implementation, are described in greater detail in U.S. patent application Ser. Nos. 11/724,882, filed Mar. 16, 2007 and 11/839,004, filed Aug. 15, 2007, which are hereby incorporated herein by reference in their entirety.

Figure 7:
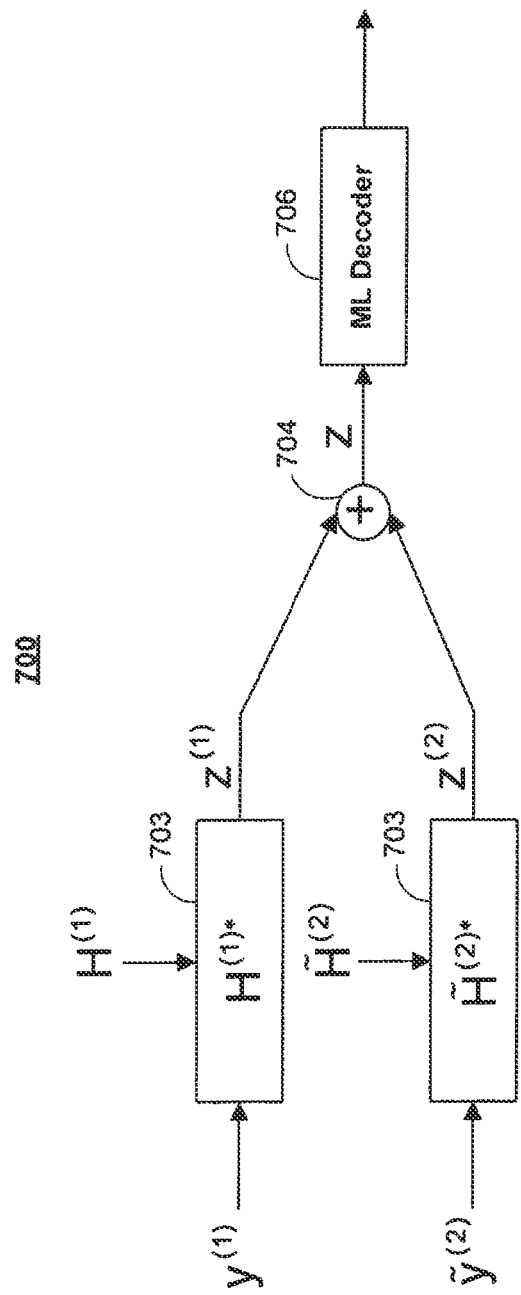

FIG. 7 shows receiver 700 that decodes received symbols in a similar manner as receiver 600. Receiver 700 includes signal processors 703, adder 704, and ML decoder 706. Signal processors 703 multiply signals $y^{(1)}$ and $\tilde{y}^{(2)}$ by the conjugate transpose of varying channel response matrices $H^{(1)}$ and $\tilde{H}^{(2)}$, respectively. Therefore, the outputs of signal processors 703 are, $$z^{(1)}=H^{(1)*}y^{(1)} \quad (12)$$

$$z^{(2)}=\tilde{H}^{(2)*}\tilde{y}^{(2)} \quad (13)$$

The signal vectors produced by each of signal processors 703 may be noisy, scaled versions of x. Thus, signal processors 703 preferably remove any phase effects caused by the channel, leaving a processed signal that differs from the transmitted symbols in magnitude and additive noise. Adder 704 combines signal vectors $z^{(1)}$ and $z^{(2)}$ into combined signal vector z using a MRC scheme or any other suitable combining technique.

The combined signal vector, z, may be decoded using maximum-likelihood (ML) decoder 706, which produces soft information in the form of log-likelihood ratios (LLR). An LLR is a common soft-bit metric associated with ML decoding, where the sign of the LLR indicates the most likely value of the transmitted bit (1 if positive, 0 if negative), and the magnitude of the LLR indicates the strength or confidence of the decision. ML decoder 706 may pick the transmit symbols, $x_1$ and $x_2$, that have the highest probability of being the correct transmit symbols. Decoder 706 may return soft information or hard information. If decoder 706 returns hard information, the hard information may have been the result of hard-decoding or mapping from soft-decoding. For a coded system, decoder 706 may return coded information or decoded information. Receivers 600 and 700 can also be implemented using other suitable signal processors and decoders such as, for example, a minimum mean squared error linear equalizer (MMSE-LE), a zero-forcing decision feedback equalizer (ZF-DFE), or a minimum mean squared error decision feedback equalizer (MMSE-DFE).

Figure 8:
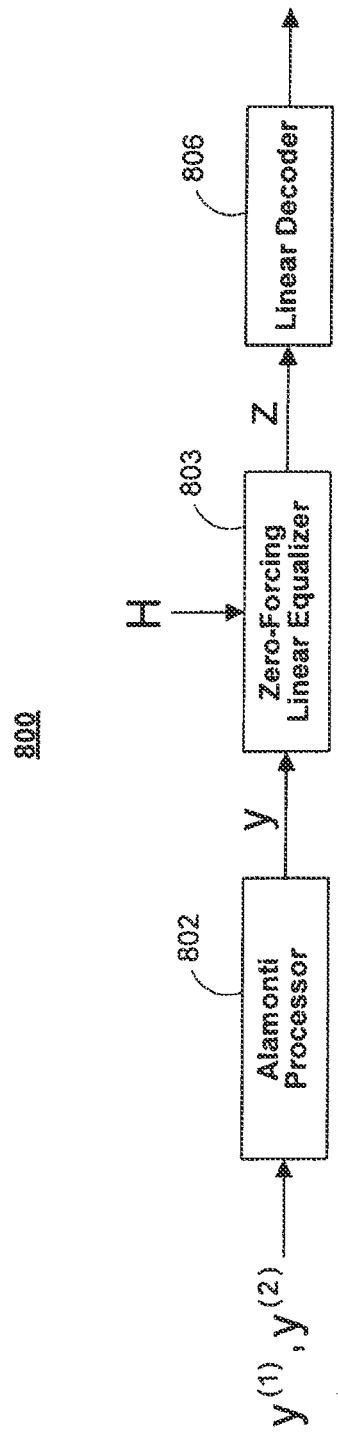
FIGS. 8 and 9 are block diagrams of receivers for combining received signal vectors and processing the combined vectors using a channel response matrix.
Figure 9:
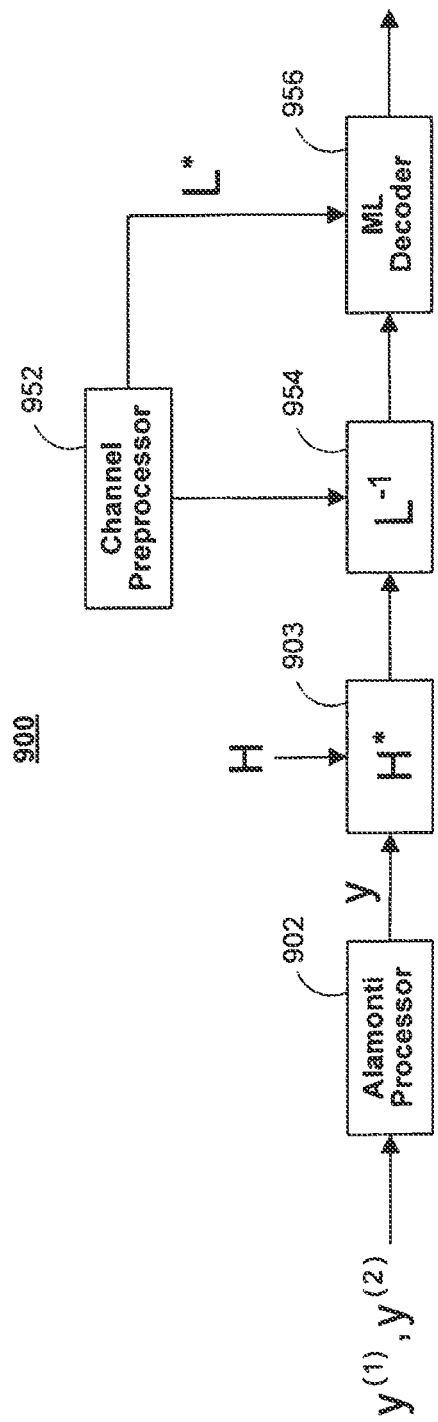

FIGS. 8 and 9 show illustrative and simplified block diagrams of receivers for decoding received symbols using a varying channel response matrix, in accordance another embodiment of the present invention. These receivers are able to directly calculate signal vector z from combined received signal vector y instead of processing received signals $y^{(1)}$ and $\tilde{y}^{(2)}$ individually.

FIG. 8 shows a receiver 800 that includes Alamouti processor 802, ZF-LE 803, and linear decoder 806. Alamouti processor 802 prepares signal vector y based on $y^{(1)}$ and $\tilde{y}^{(2)}$, the signals received in two successive symbol periods. In some embodiments, Alamouti processor 802 includes a storage device (e.g., registers) for maintaining the value of the signals received in the first symbol period while obtaining the value of the signals in the second symbol period. The operation of an ideal ZF-LE 803 on signal vector y can be written as, $$z=(H^*H)^{-1}H^*y \quad (14)$$

Instead of computing signal vector z directly using equation (14), signal vector z can equivalently be calculated using a serial approach, by, $$z=(H^{(1)*}H^{(1)}+\tilde{H}^{(2)*}\tilde{H}^{(2)})^{-1}(H^{(1)*}y^{(1)}+\tilde{H}^{(2)*}\tilde{y}^{(2)}) \quad (15)$$

in which signals $y^{(1)}$ and $\tilde{y}^{(2)}$ are processed separately and combined using an MRC approach or any other suitable combining scheme. This serial approach may improve upon the serial approach of receiver 600 (FIG. 6) (in some applications) because the processed signals in equation (15) are equalized by combined varying channel response $(H^{(1)*}H^{(1)}+\tilde{H}^{(2)*}\tilde{H}^{(2)})^{-1}$.

In some embodiments, varying channel response matrix H can be triangularized using QR decomposition to simplify the computation of equation (14). That is, matrix H can be decomposed into an orthogonal, unitary matrix Q and an upper triangular matrix R, where H=QR and $z=R^{-1}Q^*y$. This QR decomposition can be implemented using Gram-Schmidt orthogonalization or another suitable implementation. Receivers 800 can also be implemented using other suitable signal processors and decoders such as, for example, a minimum mean squared error linear equalizer (MMSE-LE), a zero-forcing decision feedback equalizer (ZF-DFE), or a minimum mean squared error decision feedback equalizer (MMSE-DFE).

FIG. 9 shows a receiver 900 that includes Alamouti processor 902, signal processors 903 and 954, channel preprocessor 952, and ML decoder 956. Channel preprocessor 952 may compute a Cholesky factorization of the varying channel response matrix, which produces, $$H^*H=LL^*, \quad (16)$$

where L is a lower triangular matrix and L* is the complex conjugate of L. Channel preprocessor may also compute the inverse of the lower triangular matrix for use by signal processor 954.

Signal processor 954 produces a processed combined signal vector that can be decoded by a lower-complexity decoder than the decoder for an unprocessed combined signal vector. Signal processor 954 multiplies the combined signal vector by the channel information obtained from channel preprocessor 952. Mathematically, signal processor 954 computes, $$z=L^{-1}H^*y \quad (17)$$

The processed combined signal vector may be provided to ML decoder 956. Decoder 956 may compute $\|z-L^*x\|^2$ for each possible value, x, of the transmitted symbols. Because L* is a triangular matrix and has many zero components, the number of computations in the matrix multiplication for each possible value of x can be significantly reduced.

Instead of computing signal vector z directly using equation (17), signal vector z can equivalently calculated using a serial approach, by computing, $$\tilde{y}^{(1)}=H^{(1)*}y^{(1)} \quad (18)$$

$$\tilde{y}^{(2)}=\tilde{H}^{(2)*}y^{(2)} \quad (19)$$

$$H^{(1)*}H^{(1)}+\tilde{H}^{(2)*}\tilde{H}^{(2)}=LL^* \quad (20)$$

$$z=L^{-1}(\tilde{y}^{(1)}+\tilde{y}^{(2)}) \quad (21)$$

in which signals $y^{(1)}$ and $y^{(2)}$ are processed separately and combined using an MRC approach or any other suitable combining scheme.

In some embodiments, varying channel response matrix H can be triangularized using QR decomposition to simplify the computation of z. That is, matrix H can be decomposed into an orthogonal, unitary matrix Q and an upper triangular matrix R, where H=QR and $z=Q^*y$. An ML decoder may the computer $\|z-Q^*y\|^2$ for each possible value, x, of the transmitted symbols.

The embodiments thus far have been described for a transmitter and receiver that utilize transmit diversity. Therefore, overall, the MIMO system transfers one symbol of information during each symbol period. This type of transmission scheme may result in a lower data rate than when a spatial multiplexing scheme is used. A transmitter implementing spatial multiplexing transmits different information at each output. Thus, the MIMO system would be capable of transferring $N_t$ symbols at each symbol period. A MIMO system that uses a spatial multiplexing scheme and can combine symbols from multiple transmissions of a signal vector is described in U.S. patent application Ser. No. 11/781,208, filed Jul. 20, 2007, which is hereby incorporated herein by reference in its entirety.

While the embodiments described herein have been primarily described with respect to transmit diversity coding schemes, these techniques can also be used for other coding systems. For example, the ZF-LE and ML decoder receiver schemes described herein can also be used in conjunction with for hybrid automatic repeat request (HARQ) or other repetition coding schemes. Similarly, while the embodiment described herein have be primarily described with respect to transmitting symbols over multiple time periods over channels having time-varying characteristics, these techniques can also be used for other channel varying characteristics such as frequency-varying characteristics.

Referring now to FIGS. 10A-10G, various exemplary implementations of the present invention are shown.

Figure 10A:
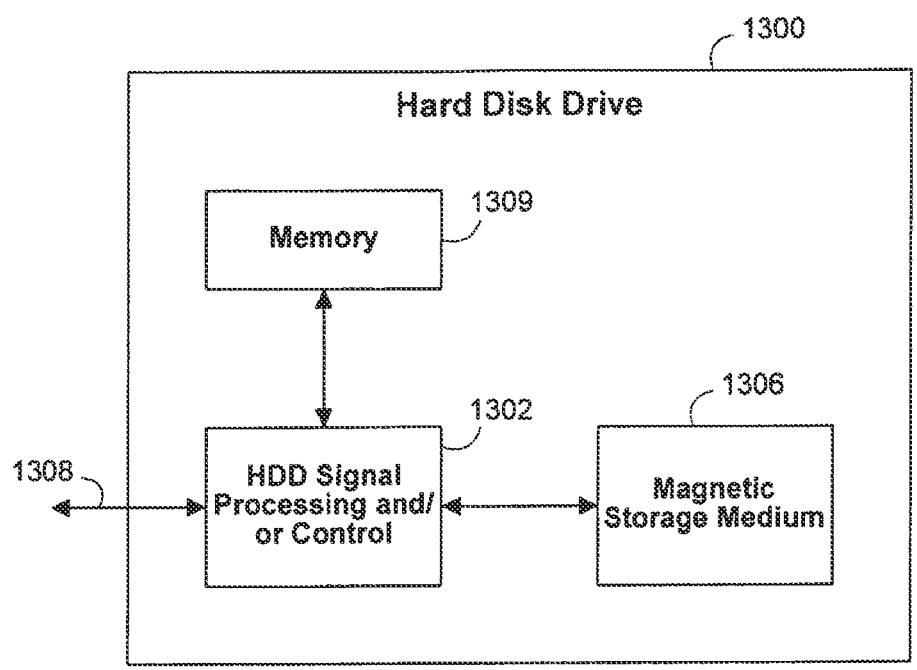
FIG. 10A is a block diagram of an exemplary hard disk drive that can employ the disclosed technology.

Referring now to FIG. 10A, the present invention can be implemented in a hard disk drive (HDD) 1300. The present invention may implement either or both signal processing and/or control circuits, which are generally identified in FIG. 10A at 1302. In some implementations, the signal processing and/or control circuit 1302 and/or other circuits (not shown) in the HDD 1300 may process data, perform coding and/or encryption, perform calculations, and/or format data that is output to and/or received from a magnetic storage medium 1306.

The HDD 1300 may communicate with a host device (not shown) such as a computer, mobile computing devices such as personal digital assistants, cellular phones, media or MP3 players and the like, and/or other devices via one or more wired or wireless communication links 1308. The HDD 1300 may be connected to memory 1309 such as random access memory (RAM), low latency nonvolatile memory such as flash memory, read only memory (ROM) and/or other suitable electronic data storage.

Figure 10B:
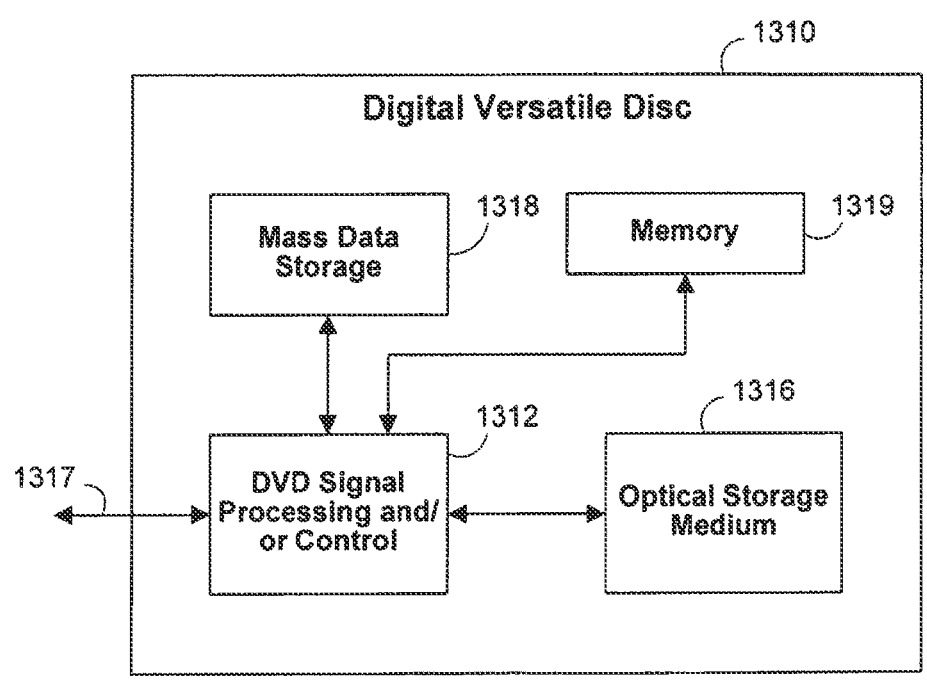
FIG. 10B is a block diagram of an exemplary digital versatile disc drive that can employ the disclosed technology.

Referring now to FIG. 10B, the present invention can be implemented in a digital versatile disc (DVD) drive 1310. The present invention may implement either or both signal processing and/or control circuits, which are generally identified in FIG. 10B at 1312, and/or mass data storage of the DVD drive 1310. The signal processing and/or control circuit 1312 and/or other circuits (not shown) in the DVD drive 1310 may process data, perform coding and/or encryption, perform calculations, and/or format data that is read from and/or data written to an optical storage medium 1316. In some implementations, the signal processing and/or control circuit 1312 and/or other circuits (not shown) in the DVD drive 1310 can also perform other functions such as encoding and/or decoding and/or any other signal processing functions associated with a DVD drive.

The DVD drive 1310 may communicate with an output device (not shown) such as a computer, television or other device via one or more wired or wireless communication links 1317. The DVD drive 1310 may communicate with mass data storage 1318 that stores data in a nonvolatile manner. The mass data storage 1318 may include a hard disk drive (HDD). The HDD may have the configuration shown in FIG. 10A. The HDD may be a mini HDD that includes one or more platters having a diameter that is smaller than approximately 1.8". The DVD drive 1310 may be connected to memory 1319 such as RAM, ROM, low latency nonvolatile memory such as flash memory and/or other suitable electronic data storage.

Figure 10C:
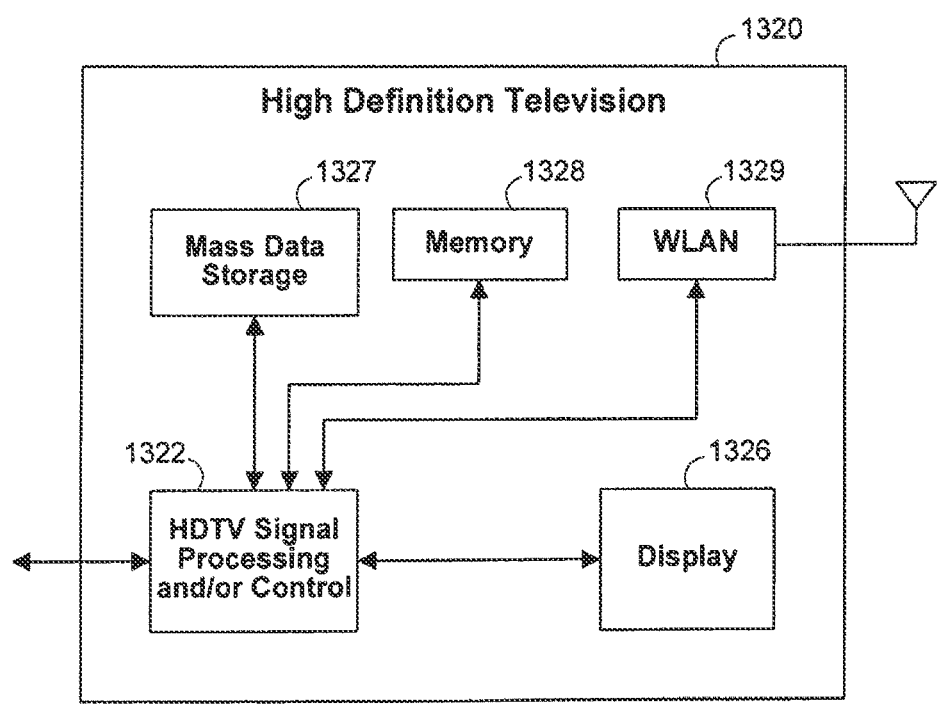
FIG. 10C is a block diagram of an exemplary high definition television that can employ the disclosed technology.

Referring now to FIG. 10C, the present invention can be implemented in a high definition television (HDTV) 1320. The present invention may implement either or both signal processing and/or control circuits, which are generally identified in FIG. 10C at 1322, a WLAN network interface 1329 and/or mass data storage 1327 of the HDTV 1320. The HDTV 1320 receives HDTV input signals in either a wired or wireless format and generates HDTV output signals for a display 1326. In some implementations, signal processing circuit and/or control circuit 1322 and/or other circuits (not shown) of the HDTV 1320 may process data, perform coding and/or encryption, perform calculations, format data and/or perform any other type of HDTV processing that may be required.

The HDTV 1320 may communicate with mass data storage 1327 that stores data in a nonvolatile manner such as optical and/or magnetic storage devices, for example, hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The HDTV 1320 may be connected to memory 1328 such as RAM, ROM, low latency nonvolatile memory such as flash memory and/or other suitable electronic data storage. The HDTV 1320 also may support connections with a WLAN via the WLAN network interface 1329.

Figure 10D:
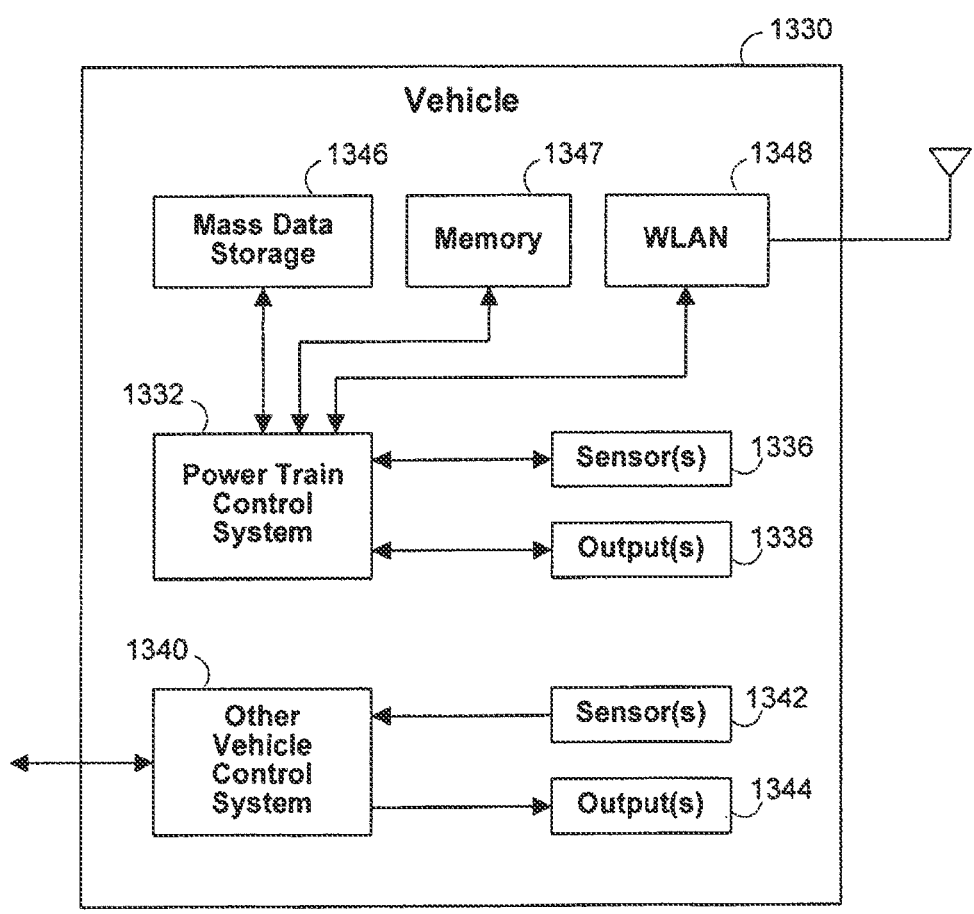
FIG. 10D is a block diagram of an exemplary vehicle that can employ the disclosed technology.

Referring now to FIG. 10D, the present invention implements a control system of a vehicle 1330, a WLAN network interface 1348 and/or mass data storage 1346 of the vehicle 1330. In some implementations, the present invention may implement a powertrain control system 1332 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be implemented in other control systems 1340 of the vehicle 1330. The control system 1340 may likewise receive signals from input sensors 1342 and/or output control signals to one or more output devices 1344. In some implementations, the control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1332 may communicate with mass data storage 1346 that stores data in a nonvolatile manner. The mass data storage 1046 may include optical and/or magnetic storage devices, for example, hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The powertrain control system 1332 may be connected to memory 1347 such as RAM, ROM, low latency nonvolatile memory such as flash memory and/or other suitable electronic data storage. The powertrain control system 1332 also may support connections with a WLAN via the WLAN network interface 1348. The control system 1340 may also include mass data storage, memory and/or a WLAN network interface (all not shown).

Figure 10E:
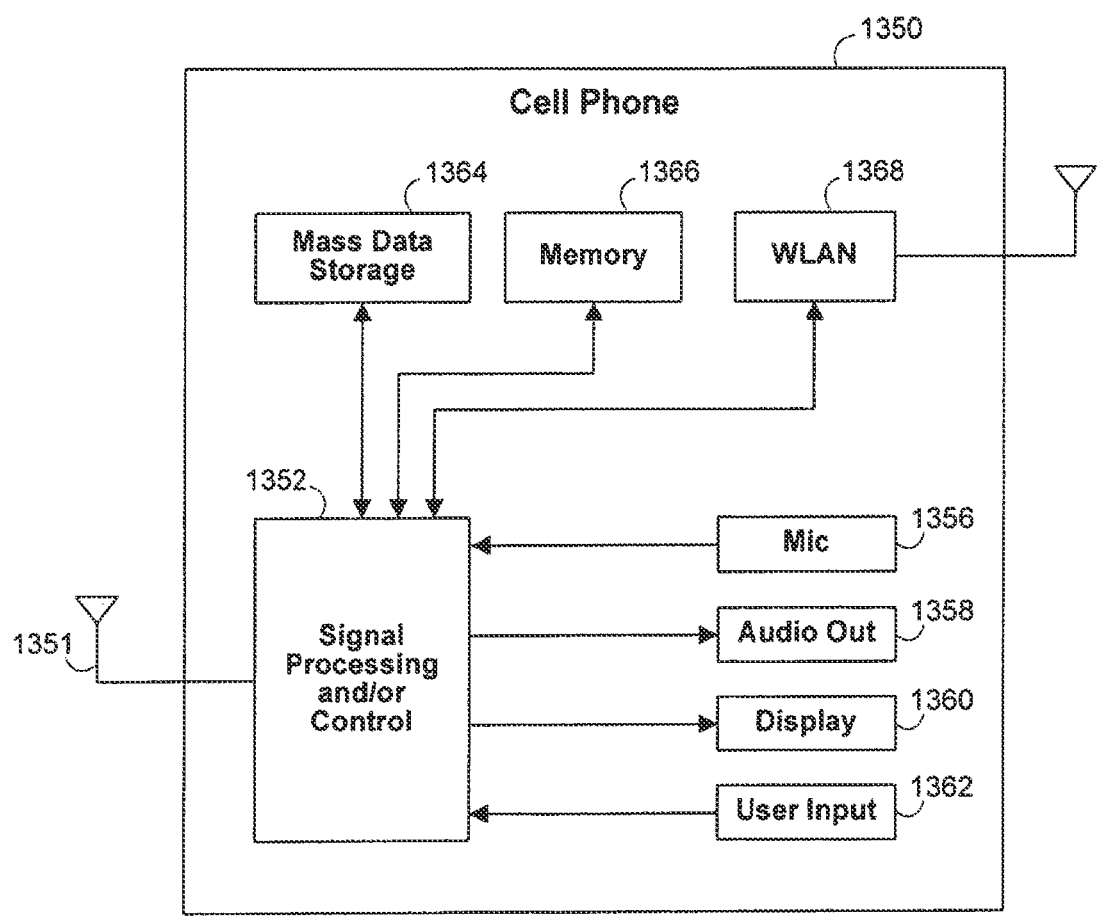
FIG. 10E is a block diagram of an exemplary cell phone that can employ the disclosed technology.

Referring now to FIG. 10E, the present invention can be implemented in a cellular phone 1350 that may include a cellular antenna 1351. The present invention may implement either or both signal processing and/or control circuits, which are generally identified in FIG. 10E at 1352, a WLAN network interface 1368 and/or mass data storage 1364 of the cellular phone 1350. In some implementations, the cellular phone 1350 includes a microphone 1356, an audio output 1358 such as a speaker and/or audio output jack, a display 1360 and/or an input device 1362 such as a keypad, pointing device, voice actuation and/or other input device. The signal processing and/or control circuits 1352 and/or other circuits (not shown) in the cellular phone 1350 may process data, perform coding and/or encryption, perform calculations, format data and/or perform other cellular phone functions.

The cellular phone 1350 may communicate with mass data storage 1364 that stores data in a nonvolatile manner such as optical and/or magnetic storage devices, for example, hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The cellular phone 1350 may be connected to memory 1366 such as RAM, ROM, low latency nonvolatile memory such as flash memory and/or other suitable electronic data storage. The cellular phone 1350 also may support connections with a WLAN via the WLAN network interface 1368.

Figure 10F:
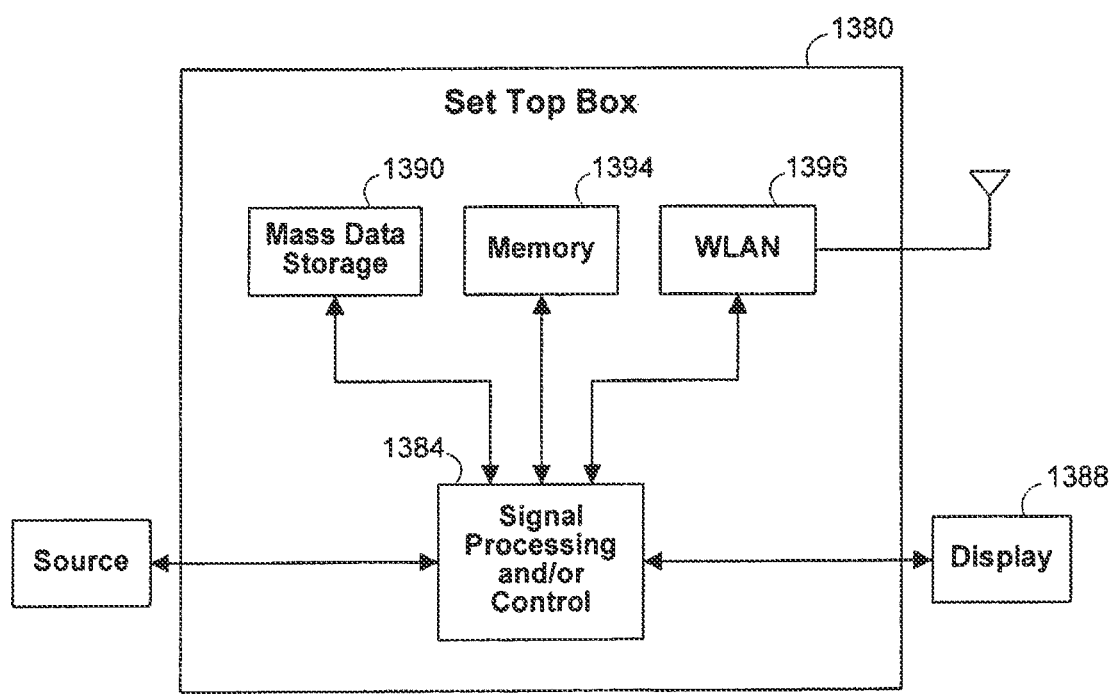
FIG. 10F is a block diagram of an exemplary set top box that can employ the disclosed technology.

Referring now to FIG. 10F, the present invention can be implemented in a set top box 1380. The present invention may implement either or both signal processing and/or control circuits, which are generally identified in FIG. 10F at 1384, a WLAN network interface 1396 and/or mass data storage 1390 of the set top box 1380. The set top box 1380 receives signals from a source such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1380 may process data, perform coding and/or encryption, perform calculations, format data and/or perform any other set top box function.

The set top box 1380 may communicate with mass data storage 1390 that stores data in a nonvolatile manner. The mass data storage 1390 may include optical and/or magnetic storage devices, for example, hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The set top box 1380 may be connected to memory 1394 such as RAM, ROM, low latency nonvolatile memory such as flash memory and/or other suitable electronic data storage. The set top box 1380 also may support connections with a WLAN via the WLAN network interface 1396.

Figure 10G:
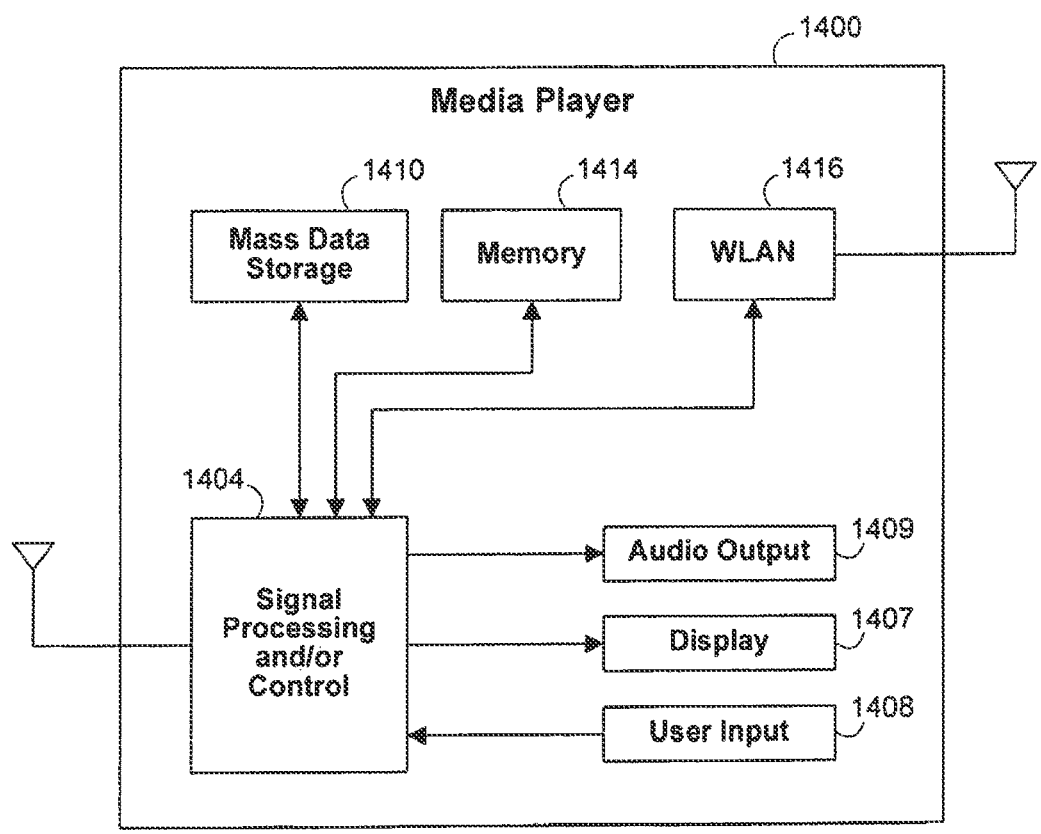
FIG. 10G as a block diagram of an exemplary media player that can employ the disclosed technology.

Referring now to FIG. 10G, the present invention can be implemented in a media player 1460. The present invention may implement either or both signal processing and/or control circuits, which are generally identified in FIG. 10G at 1404, a WLAN network interface 1416 and/or mass data storage 1410 of the media player 1400. In some implementations, the media player 1400 includes a display 1407 and/or a user input 1408 such as a keypad, touchpad and the like. In some implementations, the media player 1400 may employ a graphical user interface (GUI) that typically employs menus, drop down menus, icons and/or a point-and-click interface via the display 1407 and/or user input 1408. The media player 1400 further includes an audio output 1409 such as a speaker and/or audio output jack. The signal processing and/or control circuits 1404 and/or other circuits (not shown) of the media player 1400 may process data, perform coding and/or encryption, perform calculations, format data and/or perform any other media player function.

The media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The media player 1400 may be connected to memory 1414 such as RAM, ROM, low latency nonvolatile memory such as flash memory and/or other suitable electronic data storage. The media player 1400 also may support connections with a WLAN via the WLAN network interface 1416. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implemented in software.

What is claimed is:
1. A method of decoding a signal comprising:
receiving, at a receiver, a first signal vector associated with a first symbol transmission and a second signal vector associated with a second symbol transmission;
determining, using control circuitry, a first channel response matrix associated with the first symbol transmission and a second channel response matrix associated with the second symbol transmission;
processing, using the control circuitry, the first signal vector with the first channel response matrix to obtain a first processed signal vector;
processing, using the control circuitry, the second signal vector with the second channel response matrix to obtain a second processed signal vector; and
decoding a combined signal vector obtained by equalizing a combination of the first processed signal vector and the second processed signal vector, wherein the equalizing the combination of the first processed signal vector and the second processed signal vector comprises:
computing a first correlation matrix based on the first channel response matrix and a second correlation matrix based on the second channel response matrix;
determining a linear combination of the first correlation matrix and the second correlation matrix; and
processing the combination of the first processed signal vector and the second processed signal vector with the linear combination of the first correlation matrix and the second correlation matrix.

2. The method of claim 1, wherein the equalizing the combination of the first processed signal vector and the second processed signal vector is performed to improve a signal-to-noise ratio.

3. The method of claim 1, wherein the first processed signal vector is obtained by performing zero-forcing linear equalization based on the first channel response matrix, and the second processed signal vector is obtained by performing zero-forcing linear equalization based on the second channel response matrix.

4. The method of claim 1, wherein the first processed signal vector is obtained by performing a multiplication with the first channel response matrix and the second processed signal vector is obtained by performing a multiplication with the second channel response matrix.

5. The method of claim 1, further comprising processing the combination of the first processed signal vector and the second processed signal vector with a triangular matrix obtained by performing a factorization of the linear combination of the first correlation matrix and the second correlation matrix.

6. The method of claim 1, wherein the first symbol transmission occurs during a first transmission time and the second symbol transmission occurs during a second transmission time.

7. The method of claim 1, wherein the first symbol transmission occurs in a first frequency channel and the second symbol transmission occurs in a second frequency channel.

8. The method of claim 1, wherein the decoding the combined signal vector comprises computing a decoding metric for a set of candidate values associated with the first symbol transmission and the second symbol transmission.

9. The method of claim 1, wherein the first symbol transmission and the second symbol transmission are performed according to a transmit diversity scheme.

10. The method of claim 1, wherein the combined signal vector is decoded in response to processing the first signal vector with the first channel response matrix and processing the second signal vector with the second channel response matrix.

11. A system for decoding a signal, the system comprising:
control circuitry configured to:
receive a first signal vector associated with a first symbol transmission and a second signal vector associated with a second symbol transmission;
determine a first channel response matrix associated with the first symbol transmission and a second channel response matrix associated with the second symbol transmission;
process the first signal vector with the first channel response matrix to obtain a first processed signal vector; and
process the second signal vector with the second channel response matrix to obtain a second processed signal vector; and a decoder configured to decode a combined signal vector obtained by equalizing a combination of the first processed signal vector and the second processed signal vector, wherein the decoder obtains the combined signal vector by:
computing a first correlation matrix based on the first channel response matrix and a second correlation matrix based on the second channel response matrix;
determining a linear combination of the first correlation matrix and the second correlation matrix; and
processing the combination of the first processed signal vector and the second processed signal vector with the linear combination of the first correlation matrix and the second correlation matrix.

12. The system of claim 11, wherein the decoder is further configured to equalize the combination of the first processed signal vector and the second processed signal vector to improve a signal-to-noise ratio.

13. The system of claim 11, wherein the control circuitry is further configured to:
obtain the first processed signal vector by performing zero-forcing linear equalization based on the first channel response matrix; and
obtain the second processed signal vector by performing zero-forcing linear equalization based on the second channel response matrix.

14. The system of claim 11, wherein the control circuitry is further configured to:
obtain the first processed signal vector by performing a multiplication with the first channel response matrix; and
obtain the second processed signal vector by performing a multiplication with the second channel response matrix.

15. The system of claim 11, wherein the decoder is further configured to process the combination of the first processed signal vector and the second processed signal vector with a triangular matrix obtained by performing a factorization of the linear combination of the first correlation matrix and the second correlation matrix.

16. The system of claim 11, wherein the first symbol transmission occurs during a first transmission time and the second symbol transmission occurs during a second transmission time.

17. The system of claim 11, wherein the first symbol transmission occurs in a first frequency channel and the second symbol transmission occurs in a second frequency channel.

18. The system of claim 11, wherein the decoder is configured to decode the combined signal vector by computing a decoding metric for a set of candidate values associated with the first symbol transmission and the second symbol transmission.

19. The system of claim 11, wherein the first symbol transmission and the second symbol transmission are performed according to a transmit diversity scheme.

* * * * *